Nov. 6, 1962     C. E. PALMER     3,062,366
PLASTIC CONTAINERS
Filed June 11, 1958

INVENTOR.
CHARLES E. PALMER
BY
Lindsey and Prutzman
ATTORNEYS 3,062,366
PLASTIC CONTAINERS
Charles E. Palmer, Turnpike Road, Somers, Conn.
Filed June 11, 1958, Ser. No. 741,261
3 Claims. (Cl. 206—44.12)

This invention relates to improvements in containers of the type adapted for packaged display of items commonly sold in retail stores and for dispensing items thus displayed.

A major object is to provide an improved transparent article container and opaque display card with the container assembled in a manner to permit use of plastic sheet stock of a type and thickness heretofore considered impractical for such use due to the difficulties of assembly into container form.

Another object is to provide an article container, a portion of which is formed from a single blank of transparent biaxially oriented polystyrene sheet stock which is maintained folded in a manner to define a container with portions thereof serving as a convenient and attractive article dispenser.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

While certain types of display mounted transparent containers are known, such containers have heretofore not been fabricated from blanks of thin biaxially oriented polystyrene sheet such as Polyflex, a product of Plax Corporation, even though that material has certain characteristics which make it particularly suitable for use in such containers. Those desirable characteristics are clear transparency, inherent rigidity, low tendency towards discoloration, a smooth and tough surface skin, and a cost which is quite acceptable in the thickness range which this invention makes possible for such use. Some of the same characteristics which make biaxially oriented polystyrene a desirable container material have prevented such use, except in molded form and in thicknesses which substantially increase its cost. It is impractical to form a biaxially oriented polystyrene container by molded methods in wall thicknesses less than about .020". It is also impractical to vacuum form biaxially oriented polystyrene sheet stock of thicknesses less than about .010". Since the material is difficult to fold, and its smooth and tough surface skin resists heat sealing, the material has heretofore been considered quite unsatisfactory for processing by automatic machinery, and hence has been avoided by the packaging industry. The present invention permits use of biaxially oriented polystyrene container blanks of sheet stock thickness substantially less than .020" and as low, for example, as about .006" thickness.

Figure 1:
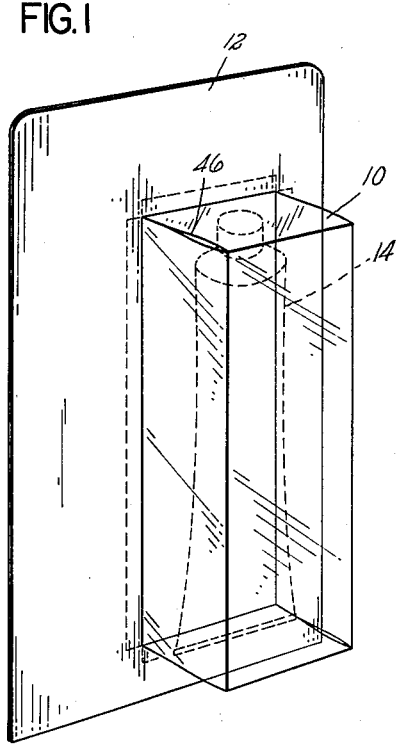
FIG. 1 is a perspective view of a transparent article container and display card incorporating the invention.
Figure 4:
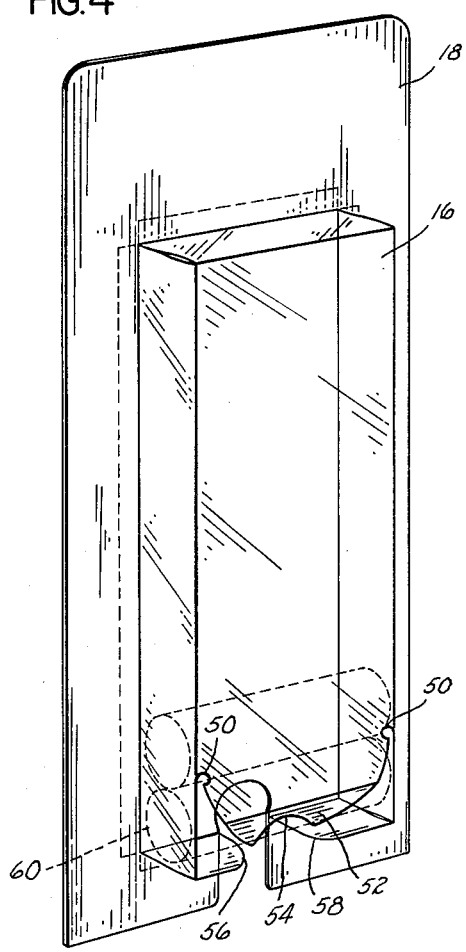
FIG. 4 is a perspective view of combined transparent article display container and article dispenser.

FIGS. 1 and 4 show display-card-mounted transparent article containers with the invention incorporated therein. FIG. 1 shows an elongate box-like transparent container 10 mounted to a display card 12 with the container having its front, side and end walls formed from a single blank of thin biaxially oriented polystyrene and with an opaque card 12 serving as a back wall closure completely to enclose an article such as tube 14 in container 10 for the permanent display thereof.

The article container of FIG. 4 includes the transparent container 16 formed and mounted on a display card 18 in the same manner as is container 10 of the FIG. 1 device, but with the lower portion of container 16 modified in a manner later described to utilize portions of the container sheet stock as an effective integrally formed article dispenser. Since the containers 10 and 16 of FIGS. 1 and 4, respectively, are formed, attached, and supported on their associated display cards 12 and 18 in the same manner, further comment in respect thereto will be directed to the structures of FIGS. 2 and 3 wherein the forming and assembly principles are best illustrated.

Figure 2:
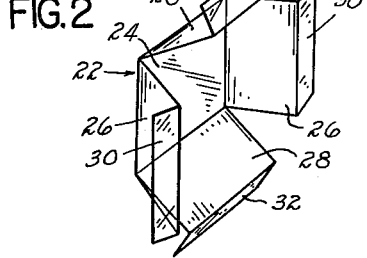
FIG. 2 shows in perspective, a blank of thin biaxially oriented polystyrene sheet stock folded in a manner to form a container when projected through an apertured mounting card.

FIG. 2 illustrates a blank of thin biaxially oriented polystyrene sheet stock 22 which has been creased and folded in a manner to assume the configuration shown, prior to final folding in the form of a box-like open end container and projected through a rectangular aperture in the supporting card. A plurality of blanks 22 may be cut in a known manner from a stack of thin biaxially oriented polystyrene sheets positioned in a cutter. Since the resulting container is to be of a rectangular configuration, the cut blanks include a rectangular central panel 24 from which project a pair of side panels 26 and a pair of end panels 28. Central panel 24 is shown as a square in FIG. 2 but would be of elongate rectangular configuration for the formation of the containers of FIGS. 1 and 4. The paired side panels 26 and 28 extend outwardly in equal distance from the center panel for the formation of the side and end walls.

A stack of panels such as 22 may be fed to an automatic machine for folding in the manner shown, with the folding accomplished by either a single or a double stage operation. The method and apparatus for most effectively accomplishing such folds, which is a separate invention, is disclosed and claimed in pending application, S.N. 741,328, filed concurrently herewith by the same inventor, now United States Patent No. 2,954,725, issued October 4, 1960. The containers herein described may be easily fabricated, however, on speed production machines with certain modifications taught in said co-pending application, and may simultaneously be loaded with articles for display at high rates of speed.

Assuming a two-stage folding operation, like outer marginal portions 30 of side panels 26 and similar portions 32 of end panels 28 are simultaneously folded to provide marginal flaps extending outwardly from the remaining wall portions. The four wall-forming panels are then simultaneously folded in a reverse direction along the lines defining the closed rectangular end wall. Due to the inherent springiness of biaxially oriented polystyrene sheet stock, the side and end walls, after being folded along the lines defining the center panel, spring outwardly to approximately the position shown in FIG. 2. This is also true of the marginal flaps which do not necessarily assume a position of right angularity in respect to the wall panels.

Figure 3:
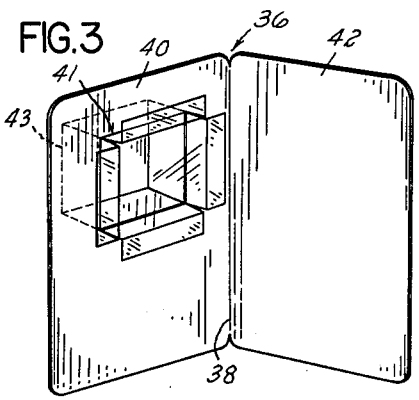
FIG. 3 shows the folded blank of FIG. 2 partially projected, in container-forming configuration, through the front panel of a display card.

The folded blank of FIG. 2 is now ready for mounting on an apertured card generically designated 36, FIG. 3, an operation which is easily handled by known automatic processing machinery. Referring to FIG. 3, card 36, formed of form-sustaining material such as cardboard, is preferably folded along a crease line 38 to define a front panel 40 and a rear panel 42. Panel 40 is provided with a rectangular aperture 41, the dimensions of which correspond to the closed end wall of the resulting container. The next step is simultaneously to fold inwardly the paired wall panels 26 and 28 and to project the closed end of the resulting box-like container, shown dotted in FIG. 3, at 43 through the aperture of front panel 40 from the back side thereof against which panel 42 folds, with the container marginal flaps abutting corresponding marginal portions of panel 40. The final step in the completion of the container is to fold panel 42 against panel 40, one or both of those panels being previously treated with an adhesive prior to the folding operation and the panels maintained pressed together sufficiently to set the adhesive to bond the panels in unitary assembly, with the four marginal flaps secured therebetween.

As best shown at 46, FIG. 1, the edges of the side and end walls of a container fabricated as above are not attached to each other and there is no need for marginally securing those walls together since sufficient inherent rigidity is attained without a bond of any sort. As illustrated in FIG. 2, the walls, when unstressed after bending, assume positions extending diagonally outwardly of the center panel. With the walls folded inwardly to form the container, and held in place by the card margins defining the aperture, the resulting stresses, or inherent bias, which tends to urge the walls back into the FIG. 2 configuration, cause a distribution of forces through the planes of the container substantially to increase the rigidity thereof.

If the biaxially oriented polystyrene panels comprising the container were separated by score lines which relieved the inherent outward bias of the panels, an unsteady structure would result, which, while form-sustaining to some degree, would be relatively fragile and deformable. Hence in order to strengthen such a structure, the unconnected margins of the present container would require sealing or some sort of bonding to supply the required inherent rigidity. The present invention, however, in recognizing that certain properties of biaxially oriented polystyrene in thin sheet stock form, heretofore considered highly undesirable, can, in fact, be utilized in a manner to produce a highly desirable enclosure, results in a substantially improved product which is easily fabricated from biaxially oriented polystyrene sheet stock in thickness ranges heretofore deemed entirely impractical for such use.

Figure 5:
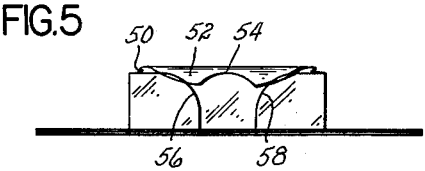
FIG. 5 is a bottom end view of the device of FIG. 4.

Referring to FIG. 4, container 16 is fabricated as above taught, however the blank from which it is formed has both its center panel and one of its end panels modified during the blank forming operation in the manner shown in FIGS. 4 and 5. Starting from opposite side margins of the center panel, a circular cut 50 extends inwardly and then downwardly toward the end panel and then reversely arced or dished at 54 to form a pair of shield-like portions 52. The bottom wall of the container is cut to define a center space between curved shoulders 56 and 58. After the bending operation during fabrication to define linear folds, and prior to mounting of the folded blank on its supporting card, the shield-like center panel portion is heated sufficiently to permit deforming and is arced downwardly as shown in FIG. 5 over a form for a sufficient time to acquire a permanent set.

With the resulting container 16 mounted on card 18 in the position shown in FIG. 4, a handy article dispenser for such items as candy rolls 60 is provided, the channel between shoulders 56 and 58 of the bottom wall and the cooperating finger area defined by the above contour of the lower end of the front panel permitting easy removal of the lower article roll, with the shield portions, the inherent rigidity of which normally retains the roll in the position shown, flexing outwardly during removal, but returning to the article retaining position shown immediately thereafter.

I claim:

1. A display package for dispensing articles comprising a card of form-sustaining opaque sheet material having front and back sheet portions, said front sheet portion having a rectilinear aperture therein and said front and back sheet portions being engaged at least along their margins to provide a unitary structure; and a box-like container of transparent semi-rigid polystyrene-like sheet of a thickness between about 0.005 and 0.020 inch, said plastic container having been formed from a substantially rectilinear blank having substantially rectilinear notches at the corners thereof to define a center panel substantially equal in size to the aperture in said card, side walls, top wall and bottom wall, the outer ends of said walls having been further folded to provide outwardly extending mounting flanges, said container being snugly received within said aperture with the flanges extending laterally outwardly between the front and back sheet portions of the card, the walls of the container being unconnected and biased into abutment with the periphery of said aperture by the inherent resiliency of the polystyrene-like sheet, said center panel being incised along its side margins adjacent the bottom wall and along the interconnection with the bottom wall to provide a resilient tab extending downwardly towards said bottom wall, and said bottom wall being incised to provide an aperture cooperating with the tab in the center panel to provide a finger opening to dispense for articles in said package.

2. A display package in accordance with claim 1 wherein the tab of the center panel extends inwardly of the container.

3. A display package for dispensing articles comprising a card of form-sustaining opaque paperboard sheet material having front and back sheet portions, said front sheet portion having a rectilinear aperture therein and said front and back sheet portions being engaged at least along their margins to provide a unitary structure; and a transparent box-like container of biaxially oriented polystyrene sheet of about 5–20 mils thickness, said container having been formed from a substantially rectilinear blank having rectilinear notches at the corners thereof to define a center panel substantially equal in size to the aperture in said card, side walls, top wall and bottom wall, the outer ends of said walls having been further folded to provide outwardly extending mounting flanges, said container being snugly received within said aperture with the flanges extending laterally outwardly from the aperture between the front and back sheet portions, the walls of the container being unconnected and biased into abutment with the periphery of said aperture by the inherent resiliency of the polystyrene sheet, said front panel being incised along its side margins adjacent the bottom wall and along the interconnection with the bottom wall to provide a resilient tab extending downwardly towards said bottom wall and having a notched-out portion extending inwardly from the bottom edge to provide a finger opening, said card having a slot opening extending from its bottom edge inwardly of the container and said bottom wall of the container, having a slot aperture registering with said slot opening in the card cooperating with the tab in the center panel to provide a finger opening to dispense articles in said package.

References Cited in the file of this patent

UNITED STATES PATENTS

| | | |
|---|---|---|
| 2,104,523 | Lichtenstein | Jan. 4, 1938 |
| 2,123,022 | Pilliod et al. | July 5, 1938 |
| 2,314,721 | Lowenstein | Mar. 23, 1943 |
| 2,602,541 | Otten | July 8, 1952 |
| 2,765,906 | Rossum | Oct. 9, 1956 |
| 2,796,985 | Gorton | June 25, 1957 |
| 2,813,624 | Phipps | Nov. 19, 1957 |
| 2,813,625 | Seyforth | Nov. 19, 1957 |
| 2,885,105 | Heyl et al. | May 5, 1959 |